United States Patent Office 3,632,651
Patented Jan. 4, 1972

3,632,651
NOVEL ULTRAVIOLET ABSORBERS
Hideo Seki and Mitsuaki Funada, Sonehigashi-cho, Toyonaka, and Kunio Ota, Miyano-cho, Takatsuki, Japan, assignors to Sumitomo Chemical Co., Ltd., Osaka, Japan
No Drawing. Filed Sept. 4, 1968, Ser. No. 757,474
Claims priority, application Japan, Sept. 28, 1967, 42/62,795
Int. Cl. C07c 49/82
U.S. Cl. 260—591                                           8 Claims

ABSTRACT OF THE DISCLOSURE

Compounds of the formula

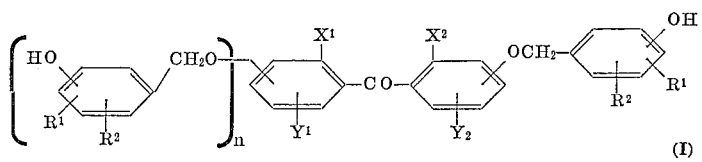

wherein $R^1$ is methyl or alkyl with 2 to 4 carbon atoms or aralkyl with 7 to 10 carbon atoms, the α-carbon atom of the alkyl and aralkyl being secondary or tertiary and $R^1$ being in the ortho position to —OH, $R^2$ is alkyl with 1 to 4 carbon atoms or aralkyl with 7 to 10 carbon atoms or a hydrogen atom, each of $X^1$ and $X^2$ is hydroxyl or a hydrogen atom, at least one of $X^1$ and $X^2$ being hydroxyl, each of $Y^1$ and $Y^2$ is a hydrogen atom, alkyl with 1 to 4 carbon atoms, alkoxy with 1 to 8 carbon atoms, or a halogen atom, and $n$ is 0 to 1, are valuable ultraviolet absorbers and antioxidants having many uses but being particularly suitable for the protection of polymeric materials.

---

The present invention relates to novel ultraviolet absorbers and to compositions containing the same.

It is known to employ compounds of the benzophenone series, benzothiazole series and salicylic acid ester series as ultraviolet absorbers. On the other hand, hindered phenol series compounds have been employed as antioxidants.

It is also well known to employ both ultraviolet absorber and antioxidant together for the same material to be stabilized. However, such ultraviolet absorber and antioxidant are not uniformly dispersed in a plastic material such as polyolefin due to the difference in the compatibilities of the ultraviolet absorber and antioxidant with the polyolefins. Accordingly, the employment of both ultraviolet absorber and antioxidant has not been satisfactory.

One object of the present invention is to provide a novel ultraviolet absorber having excellent oxidative photodegradation inhibiting action and which is free of the drawback of the conventional stabilizers mentioned above.

Still another object is to provide a novel composition containing such absorber.

Further objects will be apparent from the following description.

According to the present invention, compounds which contain both an ultraviolet absorptive moiety and an antioxidative moiety in one molecule are of enhanced effectiveness for the inhibition of oxidative photodegradation of a plastic material, e.g. polyolefin.

Accordingly, the aforesaid objects are realized by providing novel compounds of the formula

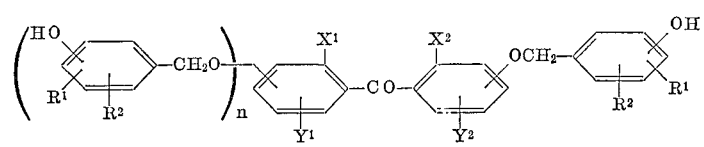

wherein $R^1$ is methyl or alkyl with 2 to 4 carbon atoms or aralkyl with 7 to 10 carbon atoms, the α-carbon atom of the alkyl and aralkyl being secondary or tertiary and $R^1$ being in the ortho position to —OH, $R^2$ is alkyl with 1 to 4 carbon atoms or aralkyl with 7 to 10 carbon atoms or a hydrogen atom, each of $X^1$ and $X^2$ being either hydroxyl or a hydrogen atom, at least one of $X^1$ and $X^2$ being hydroxyl, each of $Y^1$ and $Y^2$ is a hydrogen atom, alkyl with 1 to 4 carbon atoms, alkoxy with 1 to 8 carbon atoms or a halogen atom, and $n$ is 0 or 1.

The above mentioned novel compounds of Formula I, are prepared by reacting a benzophenone derivative of the formula

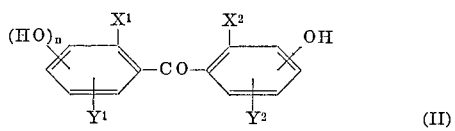

wherein $X^1$, $X^2$, $Y^1$, $Y^2$ and $n$ have the same meanings as identified above, with a benzyl halide derivative of the formula

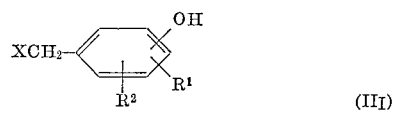

wherein $R^1$ and $R^2$ have the same meanings as identified above and X is a halogen atom, in the presence of a hydrogen halide acceptor.

Still further the present invention provides polyolefin compositions containing the above mentioned novel compounds of Formula I.

In carrying out the process for producing the present compounds of Formula I, about 1 mole of the benzophenone derivative of Formula II is reacted with about 1 to 2 moles of benzyl halide derivative of Formula III in the presence of a hydrogen halide acceptor in an amount of about 1.1 times of the theoretical amount.

As the benzyl halide derivative, chloride is advantageous. As the hydrogen halide acceptor any of those usually employed, such as potassium carbonate, sodium carbonate, potassium hydroxide, sodium hydroxide, triethylamine, pyridine, picoline, are employed.

The reaction period of time is about 3 to 6 hours.

As the reaction medium, any organic solvent inert to the reaction can be employed, among which acetone is advantageous.

Examples of the novel compound having the Formula I of the present invention include 2-hydroxy-4-[(4″-hydroxy-3″,5″-ditertiarybutyl)benzoyloxy] benzophenone,
2-hydroxy-4-[(2″-hydroxy-5″-methyl-3″-tertiarybutyl) benzyloxy] benzophenone,
2-hydroxy-4-[(2″-hydroxy-5″-methyl-3″-α-phenylethyl) benzyloxy] benzophenone,
2-hydroxy-4-[(4″-hydroxy-3″-methyl-5″-tertiarybutyl) benzyloxy]-4′-chlorobenzophenone,
2-hydroxy-4-octyloxy-4′-[(4″-hydroxy-3″,5″-ditertiarybutyl) benzyloxy] benzophenone and
2,2′-dihydroxy-4,4′-di[(4″-hydroxy-3″,5″-ditertiarybutyl) benzyloxy] benzophenone.

The present compounds of Formula I possess stronger ultraviolet absorbing action as compared with conventional ultraviolet absorbers such as those of the benzophenone series, benzotriazole series and salicylic acid ester series, and the present compounds especially absorb strongly ultraviolet rays within a range of from 280 to 350 m$\mu$, possess excellent inhibiting action against photo- and thermal-degradation of polymer material in an atmosphere of oxygen, possess very long duration times of the effects, are superior in compatibility with various polymer materials, and are effective for the protection of organic materials which are liable to be deteriorated by the action of ultraviolet rays.

Being extremely low in transmittance of ultraviolet, the present compounds of Formula I are also employable to facilitate photosensitive copying using printed paper printed with a printing ink containing compound I, or pressure sensitive copying paper which contains such compound.

It is essential for the compounds I to have hydroxyl at the 2-position of the benzophenone moiety and at another position of the benzophenone moiety a benzyloxy substituent which in turn is substituted with hydroxyl and with a secondary- or tertiary-hydrocarbon in ortho position to the hydroxyl. Both conditions are considered to be important, and the latter condition is especially important in causing the excellent effect of inhibiting the undesirable action of the ultraviolet rays on the polymer in an atmosphere of oxygen, which effect has not been known in prior ultraviolet absorbers. The substituted benzyloxy group can be attached to either one or both of the benzene nuclei of the benzophenone. Also the benzene nuclei of the benzophenone can further be substituted with alkyl, alkoxy, hydroxy, or halogen.

The materials to be blended with compound I for protection against oxidative photodegradation can be the same materials for which conventional ultraviolet absorbers such as those of the benzophenone series and benzotriazol series are employed.

Examples of plastic materials to be blended to be stabilized with the present compound include polyolefins such as polyethylene, polypropylene, poly-4-methyl-pentene-1, polystyrene and polybutene, polyvinyl halides such as polyvinyl chloride and polyvinylidene chloride, and condensation polymers such as polyester, polyamide and polyurethane.

Natural polymers such as cellulose, wool and silk can also be stabilized by the present compounds. Application fields of the present invention are so wide as to include plastics, organic chemicals, printing, paint and cosmetic industries.

The compositions of the present invention can be prepared by blending, reacting or coating the plastic materials with compound I of the present invention.

The effective amounts of compound I are varied depending upon the purpose of the application; however, it is in general within a range of from 0.001 to 10% by weight based on the weight of the material. In the case of materials which are liable to be deteriorated by ultraviolet rays, such as molded plastic articles or films, more than 0.1% is preferable. However, at most 2% is enough in the ordinary case.

The compositions of the present invention can further contain per se conventional additives such as colorants, fillers, reinforcing agents.

The following examples are given only for the purpose of illustration and it is not intended thereby to limit the invention. All parts are by weight.

EXAMPLE 1

4.3 parts of 2,4-dihydroxybenzophenone was reacted with 5.2 parts of 4-chloromethyl-2,6-ditertiarybutylphenol in the presence of sodium carbonate-containing acetone under reflux for 4 hours to yield 9.1 parts of white powder of 2 - hydroxy - 4 - [(4″ - hydroxy-3″,5″-ditertiarybutyl) benzyloxy] benzophenone of the formula,

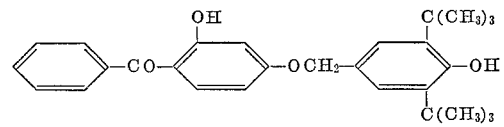

M.P. 214.0–214.2° C. U.V. absorption spectrum $\lambda_{max}$= 307 m$\mu$ log $\epsilon$=4.2.

*Elementary analysis.*—Found (percent): C, 78.14; H, 7.75. Calculated (percent): C, 77.75; H, 7.46.

0.2 part of the thus-obtained product was blended with each of 100 parts of polypropylene, polyethylene, polyvinyl chloride and polystyrene, respectively and films 0.1 mm. thick and sheets 1 mm. thick of each stabilized polymer were prepared.

These films and sheets each were exposed to a xenon fade-O-meter for 500 hours respectively.

The induction periods for oxidative photodegradation were each about 10 times as long as compared with cases of non-addition, and were each about 1.2–1.5 times as long as compared with cases of the addition of Cyasorb U.V.-531 or Inhibitor DOBP which are representative commercially available U.V. absorbers of the benzophenone series, in similar amount.

EXAMPLE 2

In similar way as in Example 1, 4.3 parts of 2,4-dihydroxybenzophenone and 4.9 parts of 2-chloromethyl-6-tertiarybutyl-4-methylphenol were reacted to yield 8.8 parts of 2-hydroxy-4-[(2″-hydroxy-5″-methyl-3″-tertiarybutyl) benzyloxy] benzophenone; U.V. absorption spectrum $\lambda_{max}$=325 m$\mu$ log $\epsilon$=4.2.

*Elementary analysis.*—Found (percent): C, 76.24; H, 6.32. Calculated (percent): C, 76.90; H, 6.71.

The thus obtained product was tested in a similar way as in Example 1, and similar results were obtained as in Example 1.

EXAMPLE 3

In similar way as in Example 1, 4.3 parts of 2,4-dihydroxybenzophenone and 5.2 parts of 2-chloromethyl-4-methyl-6-αphenylethylphenol were reacted to yield 7.5 parts of 2-hydroxy-4-[(2″ - hydroxy-5″-methyl-3″-α-phenylethyl) benzyloxy] benzophenone; U.V. absorption spectrum $\lambda_{max}$=320 m$\mu$, log $\epsilon$=4.3.

0.2 part of the thus obtained product was blended with each of 100 parts of polyethylene and polystyrene respectively and films 0.1 mm. thick of each stabilized polymer were prepared. These were exposed to sun light or to a xenon fade-O-meter. As the result, the appearance of degradation phenomena such as increase of carbonyl radical, increase of brittleness and discoloration were remarkably delayed, so that the product is an excellent photo-stabilizer in the sense of durability of effect.

EXAMPLE 4

In similar way as in Example 1, 4.3 parts of 2,4-dihydroxy-4'-chlorobenzophenone and 5.0 parts of 2-methyl-4-chloromethyl-6-tertiarylbutylphenol were reacted to yield 8.6 parts of 2-hydroxy-4-[(4''-hydroxy-3''-methyl-5'-tertiarybutyl) benzyloxy - 4' - chlorobenzophenone; U.V. absorption spectrum $\lambda_{max}$=345 m$\mu$, log $\epsilon$=4.2.

*Elementary analysis.*—Found (percent): C, 75.92; H, 6.76. Calculated (percent): C, 76.90; H, 6.71.

0.2 part of the thus-obtained product was blended with 100 parts of polypropylene at 180° C. with a roller, and pressed at 200° C. to obtain a sheet 1 mm. thick. The sheet was exposed to sun light for 90 days in summer.

As the result, the product was proved to be a superior photostabilizer as compared with known representative U.V. absorbers of the benzophenone series.

EXAMPLE 5

4.3 parts of 2,4'-dihydroxybenzophenone was reacted with 5.2 parts of 4-chloromethyl-2,6-ditertiarylbutylphenol in the presence of sodium carbonate containing acetone under reflux for 4 hours to yield 8.9 parts of white powder of 2-hydroxy-4'-[(4''-hydroxy-3'',5''-ditertiarylbutyl) benzyloxy] benzophenone; U.V. absorption spectrum $\lambda_{max}$=310 m$\mu$, log $\epsilon$=4.1.

0.2 part of the thus-obtained product was blended with 100 parts of polypropylene at 180° C. with a roller, and pressed at 200° C. to obtain a sheet 1 mm. thick. The sheet was exposed to a xenon fade-O-meter for 500 hours. As the result, degradation of the surface of the sheet was very slight and discoloration was scarcely observed, as compared with known U.V. absorbers of the benzophenone series.

What is claimed is:
1. A novel compound of the formula

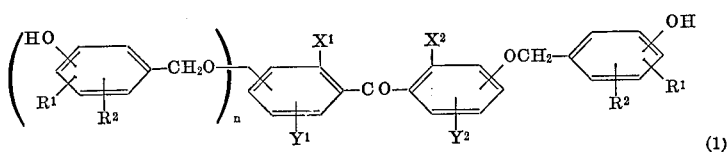

wherein $R^1$ is methyl or alkyl with 2 to 4 carbon atoms or aralkyl with 7 to 10 carbon atoms, the $\alpha$-carbon atom of the alkyl and aralkyl being secondary or tertiary and $R^1$ being in the ortho position to —OH, $R^2$ is alkyl with 1 to 4 carbon atoms or aralkyl with 7 to 10 carbon atoms or a hydrogen atom, each of $X^1$ and $X^2$ is hydroxyl or a hydrogen atom, at least one of $X^1$ and $X^2$ being hydroxyl, each of $Y^1$ and $Y^2$ is a hydrogen atom, alkyl with 1 to 4 carbon atoms, alkoxy with 1 to 8 carbon atoms or a halogen atom, and $n$ is 0 to 1.

2. 2-hydroxy-4-[(4''-hydroxy - 3'',5'' - ditertiarybutyl) benzyloxy] benzophenone.

3. 2-hydroxy-4-[(2''-hydroxy-5'' - methyl-3''-tertiarybutyl)benzyloxy] benzophenone.

4. 2-hydroxy-4-[(2''-hydroxy - 5''-methyl-3''-$\alpha$-phenylethyl)benzyloxy] benzophenone.

5. 2-hydroxy-4-[(4''-hydroxy - 3''-methyl-5''-tertiarybutyl)benzyloxy]-4'-chlorobenzophenone.

6. 2-hydroxy-4-octyloxy - 4'-[(4''-hydroxy - 3'',5''-ditertiarylbutyl)benzyloxy] benzophenone.

7. 2,2'-dihydroxy-4,4'-di[(4'' - hydroxy - 3'',5''-ditertiarybutyl)benzyloxy] benzophenone.

8. A compound according to claim 1 wherein $n$ is 0.

References Cited

UNITED STATES PATENTS 3,049,503   8/1962   Milionis _____ 260—591

DANIEL D. HORWITZ, Primary Examiner

U.S. Cl. X.R.

260—45.95